(12) United States Patent
Liu et al.

(10) Patent No.: US 10,339,188 B2
(45) Date of Patent: Jul. 2, 2019

(54) QUESTION DISTRIBUTION METHOD AND A QUESTION DISTRIBUTION SYSTEM FOR A Q AND A PLATFORM

(71) Applicant: Baidu Online Network Technology (Beijing) Co., Ltd, Beijing (CN)

(72) Inventors: Shi Liu, Beijing (CN); Fan Yang, Beijing (CN); Guohong Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 982 days.

(21) Appl. No.: 14/579,329

(22) Filed: Dec. 22, 2014

(65) Prior Publication Data
US 2015/0186537 A1 Jul. 2, 2015

(30) Foreign Application Priority Data
Dec. 20, 2013 (CN) .......................... 2013 1 0712577

(51) Int. Cl.
*G06F 7/00* (2006.01)
*G06F 17/30* (2006.01)
(Continued)

(52) U.S. Cl.
CPC . *G06F 16/9535* (2019.01); *G06Q 10/063112* (2013.01); *G09B 7/02* (2013.01); *H04L 67/26* (2013.01)

(58) Field of Classification Search
CPC ......... G06F 17/30867; G06F 17/30654; G06F 17/30979
See application file for complete search history.

(56) References Cited

U.S. PATENT DOCUMENTS

| 5,768,509 A | 6/1998 | Günlük |
| 5,910,987 A * | 6/1999 | Ginter .................... G06F 21/10 |
| | | 348/E5.006 |

(Continued)

FOREIGN PATENT DOCUMENTS

| CN | 101232468 A | 7/2008 |
| CN | 102054042 A | 5/2011 |

(Continued)

OTHER PUBLICATIONS

Li, Yao, "University of Science and Technology of China—A dissertation for doctor's degree, Question Recommendation Mechanism in User-Interactive Question Answering Systems (UIQA)", May 1, 2012. (English Abstract).

(Continued)

Primary Examiner — Hasanul Mobin
(74) Attorney, Agent, or Firm — Nixon Peabody LLP

(57) ABSTRACT

The present invention provides a question distribution method and a question distribution system for a Q & A platform, wherein the method comprises: obtaining a question entering into a Q & A platform; determining a user suitable for answering the question based on a question distribution model, and distributing the question to a third party platform where the user suitable for answering the question is located, wherein the question distributing model is established with user data collected from the third party platform interfaced with the Q & A platform; obtaining an answer to the question from the third party platform, and providing the answer to the question to a user posing the question. The present invention extends the source of answering a question to a third party platform interfaced with the Q & A platform, which breaks the limitation of the original Q & A platform, so that a user more suitable for answering the question in the third party platform can (Continued)

provide an answer, thereby enhancing the probability of the question being timely answered.

19 Claims, 8 Drawing Sheets

(51) Int. Cl.
*G06F 16/9535* (2019.01)
*H04L 29/08* (2006.01)
*G09B 7/02* (2006.01)
*G06Q 10/06* (2012.01)

(56) References Cited

U.S. PATENT DOCUMENTS

| | | | | |
|---|---|---|---|---|
| 8,473,499 | B2* | 6/2013 | Song | G06Q 50/10 |
| | | | | 706/20 |
| 8,918,391 | B2* | 12/2014 | Polonsky | G06Q 10/10 |
| | | | | 707/732 |
| 9,904,436 | B2* | 2/2018 | Zadeh | G06F 3/0482 |
| 10,262,038 | B2* | 4/2019 | Yamashita | G06F 16/24575 |
| 2008/0160490 | A1 | 7/2008 | Gomes et al. | |
| 2009/0234710 | A1* | 9/2009 | Hassine | G06Q 30/02 |
| | | | | 705/7.29 |
| 2010/0312724 | A1* | 12/2010 | Pinckney | G06N 99/005 |
| | | | | 706/11 |
| 2012/0167007 | A1* | 6/2012 | Ross | G06Q 10/10 |
| | | | | 715/811 |
| 2012/0233020 | A1* | 9/2012 | Eberstadt | G06Q 10/10 |
| | | | | 705/26.41 |
| 2013/0159272 | A1* | 6/2013 | Donmez | G06F 16/332 |
| | | | | 707/706 |
| 2014/0136187 | A1* | 5/2014 | Wolverton | G10L 15/22 |
| | | | | 704/9 |
| 2014/0214831 | A1* | 7/2014 | Chi | G06Q 50/01 |
| | | | | 707/737 |
| 2014/0324578 | A1* | 10/2014 | Chen | G06Q 30/0255 |
| | | | | 705/14.53 |
| 2015/0088998 | A1* | 3/2015 | Isensee | H04L 51/02 |
| | | | | 709/206 |

FOREIGN PATENT DOCUMENTS

| | | |
|---|---|---|
| CN | 102118431 A | 7/2011 |
| CN | 102637170 A | 8/2012 |
| CN | 103218356 A | 7/2013 |
| JP | 2003-006207 A | 1/2003 |
| JP | 2013-178681 A | 9/2013 |

OTHER PUBLICATIONS

"Application Programming Interface", Wikipedia, pp. 1-8.
"Searching Difficult Issues Using this Q&A Site," 2005, pp. 90-91 (3 pages).

* cited by examiner

● describe your question with one sentence

Please describe your question here in general here

Specifications for questions

Supplemental to the Question (Optional)

You may supplement the details of the question here

☐ Picture ♥ Location

Select a class    ☑ SMS me when receiving an answer    ☐ Anonymous    Bounty0

Submit the Question

Fig. 2a

Dear Medical Experts, 13 days after may cesarean delivery, I drink soups each day, and in daytime, my milk is enough for the baby. Sometimes, my breasts swell. Sometimes, when my baby –
Username: Tian ****** | Class: Gynecology
Sucks one side of breast, milk leaks from the other side of breast. However, after 12:00 pm at night, my baby groans and moans when sucking my milk; it seems that the milk is enough for her. She will fall asleep after sucking for a while, but will awake no more than 5 minutes later. So, each night, she can only sleep well after drinking 60ml cow milk. So, the question is: my milk is insufficient? Is there any solution? Please answer me. Many thanks.

Fig. 2b

Dear Medical Experts, 13 days after may sesarean delivery. I drink soups each day, and in daytime, my milk is enough for the baby. Sometimes, my breasts swell. Sometimes, when my baby –
Username: Tian ****** | Class: Gynecology
Sucks one side of breast, milk leaks from the other side of breast. However, after 12:00 pm at night, my baby groans and moans when sucking my milk, it seems that the milk is enough for her. She will fall asleep after sucking for a while, but will awake no more than 5 minutes later. So, each night, she can only sleep well after drinking 60ml cow milk. So, the question is: my milk is insufficient? Is there any solution? Please answer me. Many thanks.

 Wang Jie, Doctor-in-Charge Answer:
Hello, I doubt that the milk is insufficient for your baby. It is ok to add some milk powder at night to let the baby sleep well. If the milk is enough at daytime, no treatment is needed. The milk will increase gradually. If you want to improve the condition, a diet therapy may be taken to increase the milk. Generally, a galactogogue professional or nutritionist in gynecology would know how to prepare such therapy.

Further question:

Thanks for your answer and suggestion

Questioner's Rating: 1) Like Very Good, your answer solves may problem perfectly

Fig. 2c

Any news to share?   Your speech should abide by "7 pieces of bottom lines," 126 more words to go Benz 4S Stores beyond the "Fifth-Ring" of Beijing?

Facial expression  Picture  Video  Topic  Long Weibo  More ▼    Publish ▼  Release

Fig. 3a

Benz 4S Stores beyond the "Fifth-Ring" of Beijing?

Class: Beijing

You are the answer! Zhidao expect your warmhearted input~

My answer

I help, I am Happy! I will answer

Add a picture    Syn. To the Weibo   Anonymous answer   Submit the answer

Fig. 3b

QUESTION DISTRIBUTION METHOD AND A QUESTION DISTRIBUTION SYSTEM FOR A Q AND A PLATFORM

REFERENCE TO RELATED APPLICATION

The present application claims priority to Chinese Patent Application No, 201310712577.0, filed Dec. 20, 2013, the disclosure of which is incorporated herein by reference.

FIELD OF THE INVENTION

The present invention relates to the field of computer network technology, and more specifically, to a question distribution method and a question distribution system for a Question & Answer ("Q & A") platform.

BACKGROUND OF THE INVENTION

In the existing Q & A platform, when a new question is added, users of the present website will log onto the question page and provide corresponding answers on the page; this newly added question is pushed to the users of the resent website and waits for the users to answer; or answers corresponding to the problem are searched in the existing Q & A resources.

It is seen that in the existing Q & A platform, the sources for answers have a greater limitation, i.e., only limited to the users of the present website. This manner is also limited to the website size. For a rather hard or professional question, it would be hard to find an appropriate person to answer in a short time.

SUMMARY OF THE INVENTION

In view of the above, the present invention provides a question distribution method and a question distribution system for a Q & A platform, so as to break up a limitation that the source for questions and answers is the present Q & A platform website, thereby enhancing the probability of timely answers.

The specific technical solution is provided below:

The present invention provides a question distribution method for a Q & A platform, the method comprising:

obtaining a question entering into a Q & A platform;

determining a user suitable for answering the question based on a question distribution model, and distributing the question to a third party platform where the user suitable for answering the question is located, wherein the question distributing model is established by using user data collected from the third party platform interfaced with the Q & A platform;

obtaining an answer to the question from the third party platform, and providing the answer to the question to a user posing the question.

According to a preferred embodiment of the present invention, the obtaining a problem entering into a Q & A platform specifically comprises:

obtaining a question generated by a user of the Q & A platform; or, receiving a question pushed from a third party platform interfaced with the Q & A platform; or, actively pulling a question from the third party platform interfaced with the Q & A platform.

According to a preferred embodiment of the present invention, the method further comprises:

collecting user data of a third party platform interfaced with a Q & A platform; and establishing a question distribution model with the collected user data.

According to a preferred embodiment of the present invention, before establishing a question distribution model with the collected user data, the method further comprises: performing code conversion to the collected user data, said code conversion specifically comprises:

performing code conversion to the collected user data, thereby obtaining user data of a uniform code format;

performing normalization processing to code-converted user data; and performing data structure standardization to the normalized user data.

According to a preferred embodiment of the present invention, the Q & A platform is interfaced with the third party platform in the following manner:

the Q&A platform actively invokes an application program interface (API) opened by the third party platform to realize interfacing; or, the Q & A platform actively opens its own API so as to be available for the third party platform to modify the third party platform according to the API of the Q & A platform to realize interfacing.

According to a preferred embodiment of the preset invention, the question distribution model comprises at least one of a user interest model or a platform model.

The user interest model is built based on at least one of the following features on multi-dimensions and their respective weight values: a user's activity feature, a user's interest keyword feature, a user's interest tag feature, a user's interest classification feature, a user's geographical location feature, and a feature of the platform from which the user originated.

The platform model is built based on at least one of the following features on multi-dimensions and their respective weight values: keyword feature at which the platform is good, tag feature at which the platform is good, classification feature at which the platform is good, geographical location feature at which the platform is good, authority feature of the platform, and platform activity feature.

According to a preferred embodiment, the determining a user suitable for answering the question based on a question distribution model comprises:

determining, with the platform model, a third party platform suitable for answering the question, and determining a user in the determined third party platform as a user suitable for answering the question; or, determining, with the platform model, a third party platform suitable for answering the question, and then determining, with the user interest model, a user suitable for answering the question in the third party platform suitable for answering the question; or determining a third party designated by the user as the third party platform suitable for answering the question, and then determining, with the user interest model, a user suitable for answering the question in the third party platform suitable for answering the question; or determining, with an extended user interest model derived from merging the platform model and the user interest model, a user suitable for answering the question.

According to a preferred embodiment of the present invention, the method further comprises: forming a questioning page for the question on the Q&A platform; and posting an answer obtained for the question on the questioning page.

According to a preferred embodiment of the present invention, after distributing the question to the third party platform where the user suitable for answering the question is located, the method further comprises:

pushing, by the third party platform, the question to the user suitable for answering the question in a message sending manner specific to the third party platform itself; or, providing a questioning page for the question on the Q & A platform on the third party platform through a Q & A platform application embedded within the third party platform.

According to a preferred embodiment of the present invention, providing the answer to the question to a user posing the question specifically comprises:

if the question is generated by the user of the Q & A platform, pushing at least one of an SMS, an email, a message within the site for the answer to the question to the user posing the question; or, if the question is originated from a third party platform interfaced with the Q&A platform, providing the answer to the question to the third party platform from which the question is originated and pushing, by the third party platform, the answer to the question to the user posing the question in a manner specific to the third party platform itself, The present invention further provides a question distribution system for a Q & A platform, which system comprises:

a platform interfacing unit configured to perform interfacing between the Q&A platform and the third party platform;

a question obtaining unit configured to obtain a question entering into a Q & A platform;

a question distributing unit configured to determine a user suitable for answering the question based on a question distribution model, and distribute the question to a third party platform where the user suitable for answering the question is located, wherein the question distributing model is established by using user data collected from the third party platform interfaced with the Q & A platform; and an answer pushing unit configured to obtain an answer to the question from the third party platform, and providing the answer to the question to a user posing the question.

According to a preferred embodiment of the present invention, the question obtaining unit is specifically configured to obtain a question generated by a user of the Q & A platform; or, receive a question pushed from a third party platform interfaced with the Q & A platform; or, actively pull a question from the third party platform interfaced with the Q & A platform.

According to a preferred embodiment of the present invention, the system further comprises:

a data collecting unit configured to collect user data of a third party platform interfaced with a Q & A platform; and a model establishing unit configured to establish a question distribution model by using the collected user data.

According to a preferred embodiment of the present invention, the data collecting unit is further configured to perform code conversion to the collected user data, which code conversion specifically comprises:

performing code conversion to the collected user data, thereby obtaining user data of a uniform code format;

performing normalization processing to ("code-converted user data"); and performing data structure standardization to the normalized user data.

According to a preferred embodiment of the present invention, the platform interfacing unit specifically implements interfacing in a manner in which the Q&A platform actively invokes an application program interface (API) opened by the third party platform, or, in a manner in which the Q & A platform actively opens its own API so as to be available for the third party platform to modify the third party platform according to the API of the Q & A platform, According to a preferred embodiment of the preset invention, the question distribution model comprises at least one of a user interest model or a platform model;

the user interest model is built based on at least one of the following features on multi-dimensions and their respective weight values: a user's activity feature, a user's interest keyword feature, a user's interest tag feature, a user's interest classification feature, a user's geographical location feature, and feature of the platform from which the user is originated; and the platform model is built based on at least one of the following features on multi-dimensions and their respective weight values: keyword feature at which the platform is good, tag feature at which the platform is good, classification feature at which the platform is good, geographical location feature at which the platform is good, authority feature of the platform, and platform activity feature, According to a preferred embodiment, the question distributing unit is configured to determine, with the platform model, a third party platform suitable for answering the question, and determine a user in the determined third party platform as a user suitable for answering the question; or, determine, with the platform model a third party platform suitable for answering the question, and then determining, with the user interest model, a user suitable for answering the question in the third party platform suitable for answering the question; or determine a third party designated by the user as the third party platform suitable for answering the question, and then determining, with the user interest model, a user suitable for answering the question in the third party platform suitable for answering the question; or determine, with an extended user interest model derived from merging the platform model and the user interest model, a user suitable for answering the question.

According to a preferred embodiment of the present invention, wherein the system further comprises: a page generating unit configured to generate a questioning page for the question on the Q&A platform; and post an answer obtained for the question on the questioning page.

According to a preferred embodiment of the present invention, wherein the platform interfacing unit is further configured to provide a questioning page for the question on the Q & A platform on the third party platform through a Q & A platform application embedded within the third party platform.

According to a preferred embodiment of the present invention, wherein the answer pushing unit is specifically configured to: if the question is generated by the user of the Q & A platform, push at least one of an SMS, an email, a message within the site for the answer to the question to the user posing the question; or, if the question is originated from a third party platform interfaced with the Q&A platform, provide the answer to the question to the third party platform from which the question is originated, and pushing, by the third party platform, the answer to the question to the user posing the question in a manner specific to the third party platform itself.

It is seen from the above technical solutions that the present invention extends the source of answering a question to a third party platform interfaced with the Q & A platform, which breaks the limitation of the original Q & A platform, so that a user more suitable for answering the question in the third party platform can provide an answer, thereby enhancing the probability of the question being timely answered.

BRIEF DESCRIPTION OF THE ACCOMPANYING DRAWINGS

FIG. 2a shows an instance diagram of a question posting page;

FIG. 2b shows an instance diagram of a question page;

FIG. 2c shows an instance diagram on an answer page;

FIG. 3a shows an instance diagram of posting a problem through a Microblog platform;

FIG. 3b shows an instance diagram of a question page formed by posting a question on a Microblog platform on a Q & A platform;

DETAILED DESCRIPTION OF THE PREFERRED EMBODIMENTS

In order to make the objective, technical solution, and advantages of the present invention much clearer, the present invention will be described in detail with reference to the accompanying drawings and the preferred embodiments.

Traditionally, a Q & A platform relies on users accumulated in the present site to digest and resolve questions, and the approaches to expand the answering capacities are nothing more than expanding user scale or promoting single user contribution. However, current questions on the Internet assume two major trends. One is that professional questions increase, which is increasingly demanding on answer quality and professional qualifications of answerers. The other trend is that with the increasing popularity of netizens and the increase of mobile terminal netizens, various life-related questions of local areas also increase; the difficulty for these questions lies in whether a person suitable for answering questions can be found timely. Under this background, the original Q & A platform and resource accumulation can hardly satisfy the existing demands. The core idea of the present invention lies in expanding the Q & A resources to other platforms than the Q & A platforms, and even to the network-wide scope.

Hereinafter, the method provided by the present invention will be described in further detail through embodiment 1.

Embodiment 1

Figure 1:
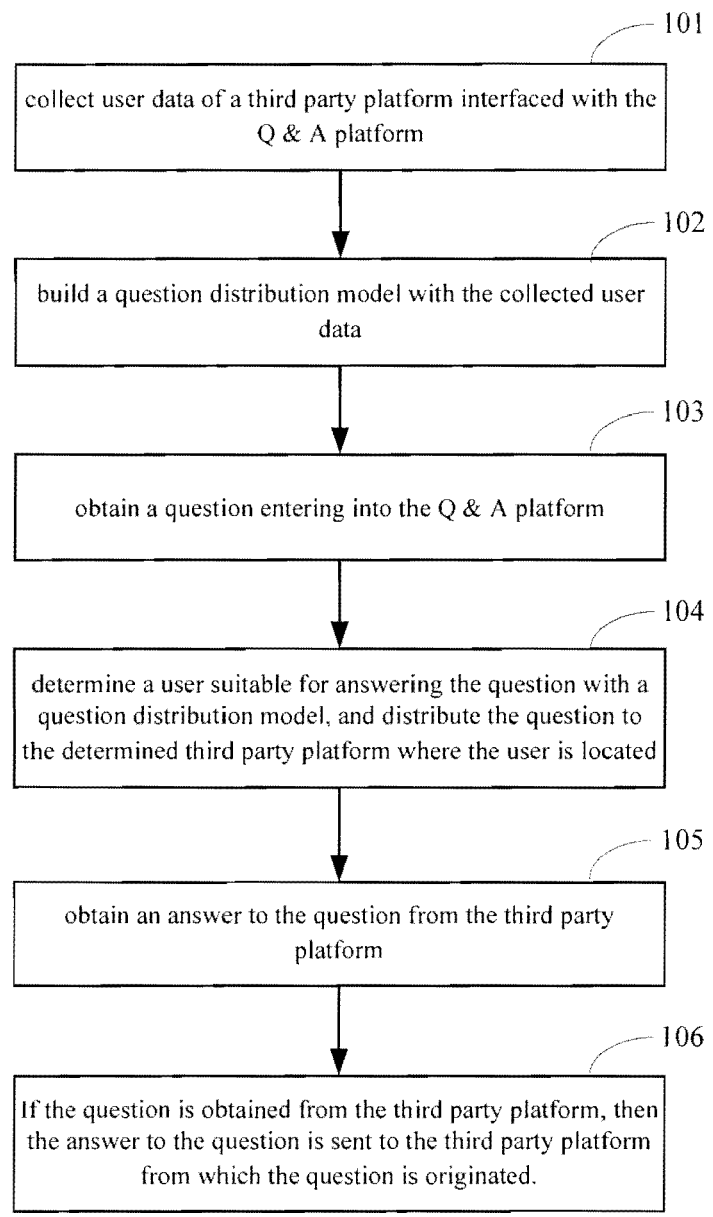
FIG. 1 shows a flow diagram of a question distributing method for a Q & A platform according to embodiment 1 of the present invention.

FIG. 1 shows a flow diagram of a question distribution method for a Q & A platform provided according to embodiment 1 of the present invention. It should be understood that the third party platform in the embodiment of the present invention refers to other platform than the Q & A platform, which may be professional vertical website platforms such as law, education, medical care, or social network platforms such as Microblog, friend circle, RenRen, or a Q & A platform from a third party, etc. As shown in FIG. 1, the question pushing method may comprise the following steps:

101: collecting user data of a third party platform interfaced with the Q & A platform.

In the present invention, the Q & A platform is interfaced with a third party platform. There may be two different interfacing manners: active interfacing of the Q & A platform and open interface of the Q & A platform.

Herein, the manner of active interfacing of the Q & A platform means the Q & A platform actively invokes an API (application programming interface) of a third party platform that has opened its APIs to perform data interaction. The manner of active interfacing is mainly directed to mainstream platforms, such as Microblog platform. A characteristic of such platforms is that the opened APIs are mostly service modes, i.e., providing a http monitoring service, so that an application party (which refers to a Q & A platform in the embodiment of the present invention) actively initiates a request to obtain or submit data.

Therefore, for this manner, regardless of the third party platform being upstream or downstream, the Q & A platform is needed to perform a active request according to the API interface that has been agreed by the counterpart. In this interfacing scenario, the third party platform need not to make any development and deployment upgrades, and the interfacing is completely performed based on an existing interface.

The manner of the open interface of the Q & A platform means the Q & A platform opens its own API, available for a third party platform to modify the website of the third party platform according to the API of the Q & A platform for interfacing. This manner is one of innovative points of the present invention. The manner of the open interface is mainly directed to a third party platform that has not been released yet, that has no fixed open interfaces, or that has a non-universal open interface. Because the API of the third party platform is uncertain or not standard, if the interfacing is performed according to the manner of active interfacing, the initial development and maintenance cost will be very high. Therefore, a preferred manner is that the Q & A platform opens its own API, and the third party platform performs interfacing according to the API of the Q & A platform.

In this manner, if the Q & A platform acts as downstream, the Q & A platform may act as Server, and the third party platform actively initiates invoke and returns a result. If the Q & A platform acts as upstream, a active pushing or passive receiving approaches may be provided.

In order to lower the interfacing cost of the third party platform, the Q & A platform may release a component package for some open third party platforms, so that the third party platforms may successfully interface by only installing the component package and performing necessary configuration, which needs no development costs, and only needs deployment update. For those actively developed third party platforms, they have to perform design and development according to the API interface provided by the Q & A platform.

In the present invention, the third party platform interfaced with the Q & A platform may be one or plural. The "plural" in the embodiments of the present invention refers to two or more.

The approach of collecting the user data of the third party platform may be receiving the user data actively pushed by the third party platform. In this case, the third party platform uses a long connection or a short connection to push user data to the Q & A platform in real time, and the monitoring service in the Q & A platform responds to the push of the third party platform in real time. It may also adopt the manner in which the Q & A platform actively pulls user data from the third party platform. In this case, the Q & A platform pulls user data by active query, and the monitoring service in the third party platform responds in real time to the pulling of the Q & A platform.

The collected user data may comprise, but is not limited to: static data such as user properties, user tags, etc., and dynamic data such as user behavior, etc. These data can directly or indirectly reflect user interest or user competence, which provide data sources for subsequently building a question distribution model.

The data provided by the third party platform may have different types or structures. Therefore, in this step, the collected user data may be further subject to format conversion, thereby lowering the difficulty of processing heterogeneous data. The format conversion here may comprise the following processing:

First, performing code conversion to the collected user data, to derive user data of a uniform code format. For example, uniformly converting the format of GBK (Chinese Internal Code Specification) code into the code format of utf-8 (8-bit Unicode Transformation Format).

After code conversion, a filtering process is performed according to preset filtering rules. The filter here may filter for specific characters, filter for quality, etc. the specific filtering rules may be customized. For example, filtering expression symbols specific in the Microblog.

Then, the above processed user data are normalized. Normalization here is mainly substitution of equivalent information, unifying the equivalent user data into the identical expression.

After the normalization processing, data structure standardization may be further performed to change key attributes in the user data into isomorphous data. For example, the contents posted by the user, user ID, and post time in the user data are stored in content, user_id and create_time fields, respectively, while the remaining contents are stored in other field.

The collected user data may be stored in a database so as to be available for subsequently building a question distribution model. Besides, the step of collecting user data from the third party platform may be a periodic or continuous process, thereby guaranteeing that the user data in the database can be updated in time.

102: building a question distribution model by using the collected user data.

The question distribution model here mainly comprises: a user interest model and a platform model.

Herein, the user interest model may be built from features on multi-dimensions embodying user interest. These features may comprise, but not limited to, at least one of the following features: activity feature, interest keyword feature, interest tag feature, interest classification feature, geographical location feature, source platform feature, etc., each feature having a corresponding weight value.

Herein, the activity feature indicates the active degree of the user, which reflects the user's capability of timely answering questions. The active degree may be reflected by the number of questions distributed to the user and the number of answers provided by the user; besides, the attenuation condition of the active degree should also be considered. For example, the user's current active degree $UF_{Ai}$ may be:

$$UF_{Ai} = UF_{acurrent} + \sum_{j=1}^{n} \alpha^j * UF_{Ai-j}$$

wherein j is a time unit, α is an attenuation coefficient of the active degree feature with time, and n is the current aggregated time unit. $UF_{acurrent}$ is a value of an active degree currently fed back and calculated by the user on the question distribution system, which may expressed as:

$$UF_{acurrent} = w_1 * \log_2\left(\frac{w_a * AA + 1}{AP + 1} + 1\right) + w_2 * \log_2\left(\frac{w_b * RA + 1}{RP + 1} + 1\right)$$

wherein AA denotes the total number of answers, AP denotes the total number of questions distributed to the user, RA denotes the number of answers in the current time unit, RP denotes the number of questions distributed to the user in the current unit time, $w_1$ and $w_2$ are normalized weights, $w_a$ and $w_b$ are weighted coefficients.

The interest keyword feature indicates a finer granularity of interest of the user, which may be extracted from the questions distributed to the user and from the answers provided by the user, or extracted from the contents posted by the user on the third party platform, or extracted from the interest keywords customized by the user.

The interest tag feature is an interest embodiment for the interest keyword on the upper layer of granularity, which may be extracted from a tag of the user in the third party platform, or extracted from a tag expanded and mined by the user from a user relationship of the user on the third party platform, or extracted from a tag customized by the user.

The interest classification feature is an interest embodiment on the granularity of the interest tag feature and interest keyword feature, which is generally a feature obtained after clustering the interest keywords and interest tag.

The geographical feature is a sketch of the user's geographical location attributes, which may be obtained from the geographical location attributes of the user on the third party platform or the geographical location features customized by the user.

The source platform feature is an identification and description of the platform from which the user is originated, and the corresponding weight value may be decided by the authority of the third party platform.

The user interest model may be used to determine it is better to distribute a specific question to which user, i.e., for determining a user suitable for answering the question. Besides specific to the user level, there also exists such a demand as that a specific question should be distributed to which third party platform so as to be solved better, i.e., determining a third party platform suitable for answering the question. In this case, a platform model will be used.

The platform model may also be built based on feature(s) on multi-dimensions embodying the platform capabilities. The feature(s) may comprise but not limited to, at least one of the following features: a keyword feature at which the platform is good, a tag feature at which the platform is good, a geographical location feature at which the platform is good, an authority feature at which the platform is good, and an active degree feature of the platform, each feature having a corresponding weight value.

Herein, the keyword feature at which the platform is good may be extracted from the questions distributed to the platform and the answers provided by the platform, or extracted from the contents on the platform, or determined by the experts empirically based on the contents on the platform.

The tag feature at which the platform is good may be extracted from the tag in the feature, or determined by the experts empirically based on the tag in the platform.

The classification feature at which the platform is good may be derived by clustering the keyword features and tag features at which the platform is good, or determined by the experts empirically based on the contents in the platform.

The geographical location feature at which the platform is good may be determined from the geographical location attribute of the user in the platform, or determined empirically by the experts.

The authority feature of the platform may be derived from the authority evaluation of the platform by means of a search engine, or determined from the questioning user's evaluation on the answer provided by the platform.

The active degree feature of the platform may be determined based on at least one of the total number of users of the platform, the number of daily active users of the platform, the total number of users providing answers, and the number of daily active users providing answers.

The above steps 101 and 102 are operations performed offline, and the distribution process for an online question may be divided into the following steps,

103: obtaining a question entering into the Q & A platform

The question may be generated by a user of the Q & A platform, e.g., a user of the Q & A platform logs onto the Q & A platform and poses a question, or generated by a third party platform interfaced with the Q & A platform. In this case, the manner of receiving a question actively pushed from the third party platform, or the manner of actively pulling a question from the third party platform may be employed. For example, in a Microblog platform interfaced with the Q & A platform, a Microblog user posted a Microblog on the Microblog to poses a question. The Microblog platform may push the question to the Q & A platform via an interface interfaced with the Q & A platform, or the Q & A platform actively pulls the question.

Because the questions posed by users on different platforms are varied, the obtained questions may be subject to a basic filtering. The filtering policy may be customized for the platforms from which the questions are originated, or globally customized, thereby intercepting some questions that are not desired to enter into the subsequent distribution process.

The filtering policy involved here may comprise, but not limited to: filtering advertisements, filtering sensitive information, and filtering meaningless spam contents, etc., wherein filtering advertisements is mainly based on the data form of the question, e.g., filtering questions including pictures, videos, and the like, which very likely comprise advertisement contents. Filtering sensitive information and meaningless spam contents is mainly based on keywords or semantics,

104: determining a user suitable for answering the question with a question distribution model, and distributing the question to the determined third party platform where the user is located.

This step mainly involves performing basic feature identification to a question, determining a user suitable for answering the question with a question distribution model, and completing a mapping from a question to a user set. The mapping here means performing a non-reciprocal issuing based on the features of the question and the features of respective platform users, rather than uniformly issuing or being digested within the platform, wherein the features of the question may comprise the semantics features of the question or the information about the platform where the question is originated.

Here, the following manners may be adopted to determine a user suitable for answering the question:

Manner 1: determining, with a platform model, a third party platform suitable for answering the question, and determining all users in the third party platform as the user suitable for answering the question.

With this manner, first, features of respective dimensions are extracted from a to-be-distributed question based on features on respective dimensions in the platform model, and after mapping the extracted features to the features on respective dimensions in the platform model, then calculating, with the weight values of respective features, the score values of answers of respective platforms to the question, and selecting a platform whose score value satisfies a preset condition therefrom as the third party platform suitable for answering the question.

Manner 2: determining, with a platform model, a third party platform suitable for answering the question, and then determining, with the user interest model, a user suitable for answering the question in the third party platform.

In the case of determining, with the user interest model, a user suitable for answering the question, the features on respective dimensions are extracted from the to-be-distributed question according to the features on respective dimensions in the user interest model, and after the extracted features are mapped to the features on respective dimensions in the user interest model, score values of respective users answering the question in the determined third party platform are calculated with the weight values of respective users, and a user whose score value satisfies a preset condition is selected therefrom as a user suitable for answering the question.

Manner 3: comprehensively determine a user suitable for answering the question by combining the platform model and the user interest model.

In this manner, the platform model and the user interest model are fused, i.e., incorporating the features of the platform to which the user belongs into the user interest model, thereby obtaining the expanded user interest model, and a question-to-user mapping is performed based on the expanded user interest model. Based on the features on respective dimensions in the expanded user interest model, features on respective dimensions are extracted from a to-be-distributed question; after the extracted features are mapped to features on respective dimensions in the expanded user interest model, score values of respective users answering the question are calculated with the weight values of respective features, and a user whose score value satisfies the preset condition is selected therefrom as the user suitable for answering the question.

Additionally, besides determining, with a question distribution model, which third party platform the question is sent to as depicted in 104, a third party platform may also be designated by a questioning user, and then the Q & A platform performs question distribution based on the third party platform designated by the user, After the question is distributed to the third party platform, the question may be distributed to a user suitable for answering the question on the third party platform mainly in the following two manners:

Manner 1: the third party platform pushes the question with a messaging manner specific to the platform. With the Microblog platform as an example, the Microblog platform has its specific messaging manner, e.g., citing (@) a Microblog user, commenting on a Microblog user, and privately sending a message to a Microblog user, etc.; here, its specific messaging user may be utilized to push the question to the user suitable for answering the question.

Manner 2: adopting a manner of embedding a Q & A platform application within the third party platform, and a question page for the question on the Q & A platform may be provided on the third party platform through the embedded Q & A platform application, then the user of the third party platform can perform answering the question on the questioning page. In this manner, a user of the third party platform actually performs data interaction with the Q & A platform application.

105: obtaining an answer to the question from the third party platform.

For the question distributed to the third party platform, if an answer is provided by a corresponding user to the question, then the Q & A platform may obtain the answer to the question from the third party platform by receiving the answer actively pushed by the third party platform or actively obtaining the answer from the third party platform.

If the question is generated by a user of the Q & A platform, then it is just required to push the answer to the question to the user of the present Q & A platform. The manner of pushing may be SMS, email, in-site message, etc. Or, the answer to the question is posted on the page where the question is located. If the question is obtained from the third party platform, 106 will be executed in continuation.

106. If the question is obtained from the third party platform, then the answer to the question is sent to the third party platform from which the question is originated.

If the question is a question dug out by the third party platform from itself, then the third party platform adopts its platform specific manner to post the answer to the question. If the question is posed by a user of a third party platform, the answer will be sent by the third party platform to the corresponding questioning user. Specifically what manner is adopted by the third party platform to send to the corresponding questioning user, it may be decided based on the manner specific to the third party platform.

It should be noted that the question in the embodiment of the present invention comprises the question as initially posed, further question, modification and supplementation to the question. All of these will be pushed in association and updated on the questioning page.

Two specific instances are provided here:

Instance 1.

After user A on the Q & A platform logs onto the Q & A platform, the question is posted through the page shown in FIG. 2*a*. Besides posting the question, class of the question, answer sending manner of the answer, or designation of the third party platform to which the question is distributed, and the like may be selected on the page. Suppose the questioning page formed by the posted question is shown in FIG. 2*b*. Because the question is of a medical field, it may be determined, with the question distribution model, that the kind of the question is suitable for a vertical platform in the medical field interfaced with the Q & A platform, and specifically suitable for obstetrics and gynecology experts in the vertical platform of medical field interfaced with the Q & A platform. Meanwhile, other users on the Q & A platform may also provide answers on the questioning page. If an obstetrics and gynecology expert on the vertical platform in the medical field provides an answer to the question, the answer will be sent back to the Q & A platform, and the Q & A platform will send the answer to the questioning user according to the answer sending manner selected by the user. Meanwhile, the answer may be posted on the questioning page, as shown in FIG. 2*c*. It is seen that through this manner, the user on the Q & A platform can obtain help from a user of other platform than the present platform. It is more appropriate for such users to answer this question, and the user can obtain the answer more timely.

Instance 2

Microblog user B on the Microblog platform posted a piece of Microblog to pose a question, as shown in FIG. 3*a*. After the Microblog platform obtains the real-time question, the question is sent to the Q & A platform via an interface interfaced with the Q & A platform. The Q & A platform, after obtaining the question, also generates a questioning page, as shown in FIG. 3*b*, so that a user at the Q & A platform can also answer the question. Of course, it is also allowed not to generate a posing page.

Figure 3C:
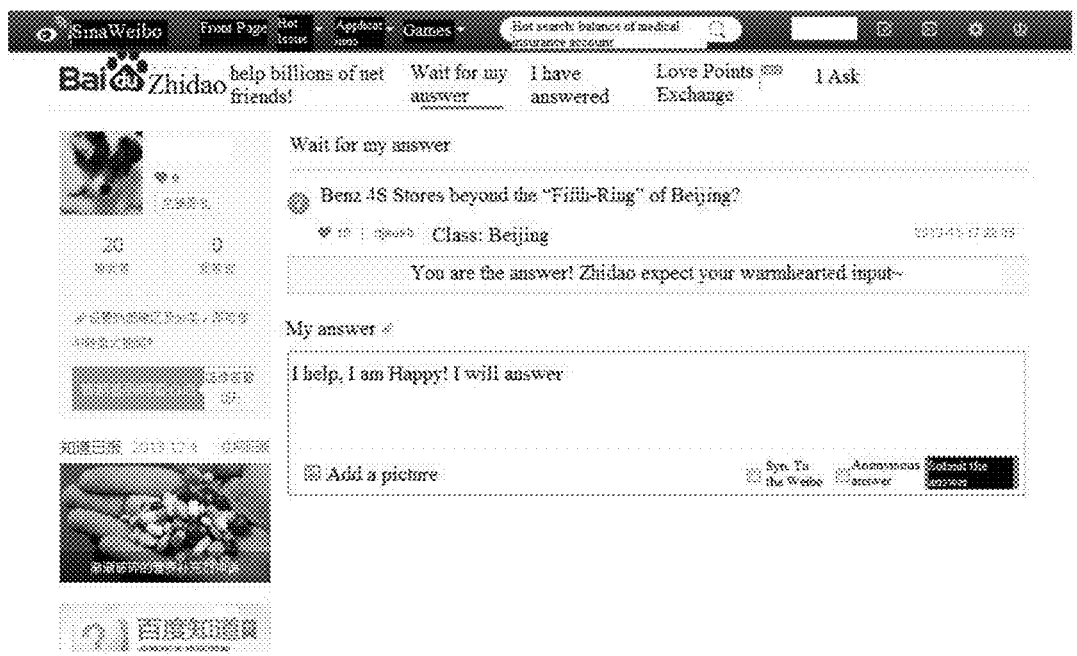
FIG. 3c shows a diagram of displaying a question page by embedding a Q & A platform application on a Microblog platform.
Figure 3D:
FIG. 3d shows a diagram of updating a question page by embedding a Q & A platform application on a Microblog platform.

The Q & A platform determines, based on the question distribution model, that the question is suitable for a Beijing user of a social networking platform or a user interested in automobiles. Suppose the social networking platform interfaced with the Q & A platform is only Microblog, then the Q & A platform will send the question to the Microblog platform, and the Microblog platform will send the question to Beijing's Microblog user or a Microblog user interested in automobiles. There is a further manner, i.e., the Microblog platform may post the question with an embedded Q & A platform application. Through this embedded Q & A platform application, the Microblog user may view a questioning page for the question on the Q & A platform through the embedded Q & A platform application, as shown in FIG. 3*c*. When the Microblog platform obtains the answer to the question, the answer is re-fed back to the Q & A platform. The Q & A platform re-sends back to the Microblog platform, and then the Microblog platform pushes the answer to the question to the questioning Microblog user by citing (@), private message, or commenting on the counterpart's Microblog. Meanwhile, the Q & A platform may also pose the answer to the question on a questioning page, thereby accumulating the resources of the present site. Besides, the contents updated on the questioning page will also be updated in the Q & A platform application embedded on the Microblog platform, as shown in FIG. 3*d*.

The method provided by the present invention has been described above in detail. Hereinafter, the system provided by the present invention will be described in detail through embodiment II.

Embodiment II

Figure 4:
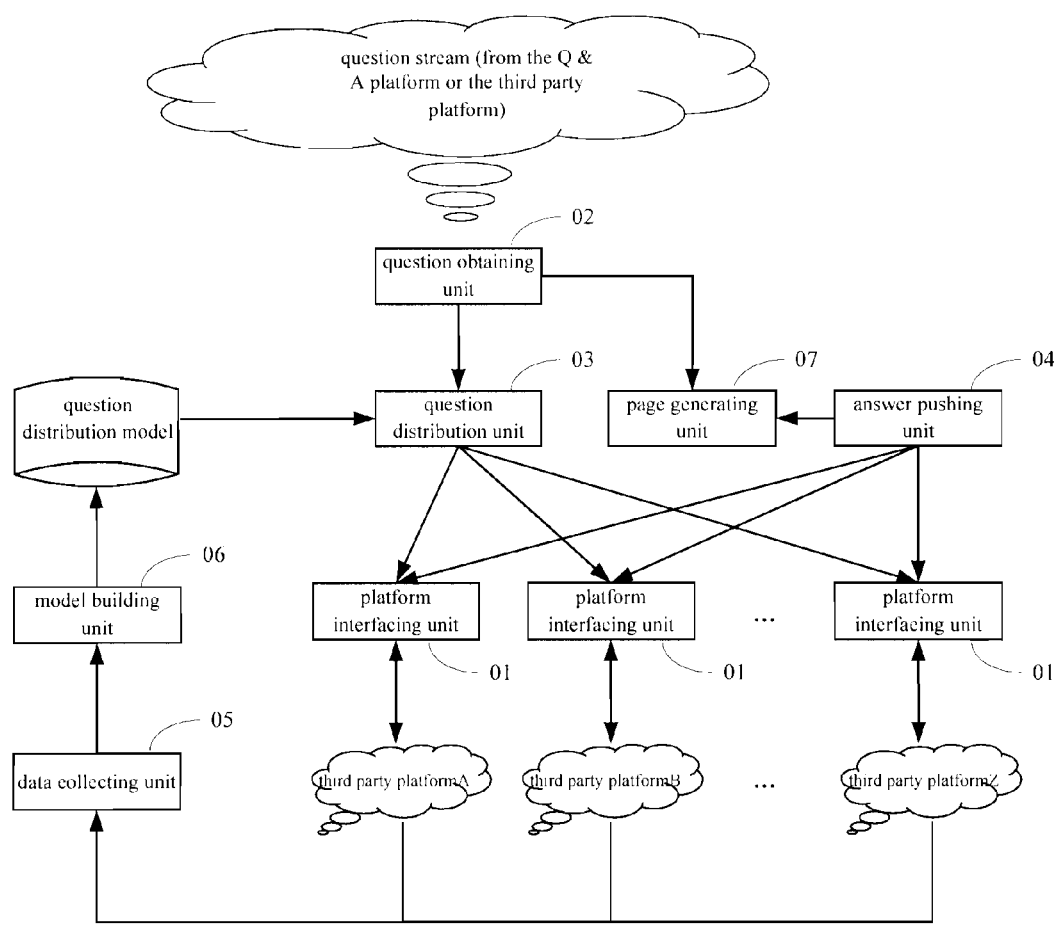
FIG. 4 shows a structural diagram of a question distribution system for a Q & A platform provided by embodiment 2 of the present invention.

FIG. 4 shows a structural diagram of a question distribution system for a Q & A platform provided by Embodiment II of the present invention. The question distribution system may be disposed in the Q & A platform. As shown in FIG. 4, the question distribution system may comprise: a platform interfacing unit 01, a question obtaining unit 02, a question distribution unit 03, and an answer pushing unit 04, and it may further comprise a data collecting unit 05, a model establishing unit 06, and a page generating unit 07.

Herein, the platform interfacing unit 01 mainly implements interfacing between the Q & A platform and the third party platform. The interfacing manner may have two manners: Q & A active interfacing and Q & A platform open interface.

Herein, the manner of active interfacing of the Q & A platform means the Q & A platform actively invokes an API of a third party platform, that has opened its APIs, to perform data interaction. The manner of active interfacing is mainly directed to mainstream platforms, such as Microblog platform. A characteristic of such platforms is that the opened APIs are mostly service modes, i.e., providing a http monitoring service, so that an application party (which refers to a Q & A platform in the embodiment of the present invention) actively initiates a request to obtain or submit data.

Therefore, for this manner, regardless of the third party platform being upstream or downstream, the Q & A platform is needed to perform a active request according to the API interface that has been agreed by the counterpart. In this interfacing scenario, the third party platform needn't make any development and deployment upgrades, and the interfacing is completely performed based on an existing interface.

The manner of the opened interface of the Q & A platform means the Q & A platform opens its own API, available for a third party platform to modify the website of the third party platform according to the API of the Q & A platform for interfacing. This manner is one of innovative points of the present invention. The manner of the open interface is mainly directed to a third party platform that has not been released yet, that has no fixed open interfaces, or that has a non-universal open interface. Because the API of the third party platform is uncertain or not standard, if the interfacing is performed according to the manner of active interfacing, the cost of initial development and maintenance will be very high. Therefore, a preferred manner is that the Q & A platform opens its own API, and the third party platform performs interfacing according to the API of the Q & A platform.

In this manner, if the Q & A platform acts as downstream, the Q & A platform may act as Server, and the third party platform actively initiates invoke and returns a result. If the Q & A platform acts as upstream, a active pushing or passive receiving approaches may be provided.

In order to lower the interfacing cost of the third party platform, the Q & A platform may release a component package for some open third party platforms, so that the third party platforms may successfully interface by only installing the component package and performing necessary configuration, which needs no cost of development, and only needs deployment update. For those self-developed third party platforms, they have to perform design and development according to the API interface provided by the Q & A platform.

The question obtaining unit 02 is responsible for obtaining a question entering into the Q & A platform. The question may be generated by a user of the Q & A platform, e.g., a user of the Q & A platform logs onto the Q & A platform and poses a question, or generated by a third party platform interfaced with the Q & A platform. In this case, the manner of receiving a question actively pushed from the third party platform, or the manner of actively pulling a question from the third party platform may be employed.

Then, the question distributing unit 03 determines a user suitable for answering the question with a question distribution model, and distributes the question to the third party platform where the user suitable for answering the question is located via the platform interfacing unit 01, wherein the question distributing model is built based on the user data collected from the third party platform interfaced with the Q & A platform.

Finally, the answer pushing unit 04 obtains an answer to the question from the third party platform via the platform interfacing unit 01 and provides the answer to the question to the questioning user of the question.

In order to build the question distribution model, it is required that the data collecting unit 05 collect user data of the third party platform interfaced with the Q & A platform. The approach of collecting the user data of the third party platform may be receiving the user data actively pushed by the third party platform. In this case, the third party platform uses a long connection or a short connection to push user data to the Q & A platform in real time, and the monitoring service in the Q & A platform responds to the push of the third party platform in real e. It may also adopt the manner in which the Q & A platform actively pulls user data from the third party platform. In this case, the Q & A platform pulls user data by active query, and the monitoring service in the third party platform responds in real time to the pulling of the Q & A platform.

The collected user data may comprise, but not limited to: static data such as user properties, user tags, etc., and dynamic data such as user behavior, etc. These data can directly or indirectly reflect user interest or user competence, which provide data sources for subsequently building a question distribution model.

The data provided by the third party platform may have different types or structures. Therefore, the data collecting unit 05 may perform format conversion to the collected user data. The format conversion here may specifically comprise: performing code conversion to the collected user data, to derive user data of a uniform code format; normalizing the code-converted user data; performing data structure standardization to the normalized user data.

The user data collected by the data collecting unit 05 may be stored in a database so as to be available for subsequently building a question distribution model. Besides, the operation of collecting user data from the third party platform by the data collecting unit 05 may be a periodic or continuous process, thereby guaranteeing that the user data in the database can be updated in time.

The model building unit 06 is responsible for building a question distributing model by using the collected user data.

The question distribution model here mainly comprises at least one of a user interest model or a platform model, wherein, the user interest model may be built from at least one of the following features on multi-dimensions and their respective weight values: activity feature, interest keyword feature, interest tag feature, interest classification feature, geographical location feature, source platform feature, etc., each feature having a corresponding weight value. The platform model may also be built based on features on multi-dimensions embodying the platform capabilities. These features may comprise, but not limited to, at least one of the following features: a keyword feature at which the platform is good, a tag feature at which the platform is good, a geographical location feature at which the platform is good, an authority feature at which the platform is good, and an active degree feature of the platform, each feature having a corresponding weight value. The specific meanings of these features may refer to relevant depictions in Embodiment 1, which will not be detailed here.

The question distributing unit 03 may determine a user suitable for answering the question in the following manners:

Manner 1: determining, with a platform model, a third party platform suitable for answering the question, and determining a user in the determined third party platform as the user suitable for answering the question.

With this manner, first, features of respective dimensions are extracted from a to-be-distributed question based on features on respective dimensions in the platform model, and after mapping the extracted features to the features on respective dimensions in the platform model, then calculating, with the weight values of respective features, the score values of answers of respective platforms to the question, and selecting a platform whose score value satisfies a preset condition therefrom as the third party platform suitable for answering the question, Manner 2: determining, with a platform model, a third party platform suitable for answering the question, and then determining, with the user interest model, a user suitable for answering the question in the third party platform suitable for answering the question.

In the case of determining, with the user interest model, a user suitable for answering the question, the features on respective dimensions are extracted from the to-be-distributed question according to the features on respective dimensions in the user interest model, and after the extracted features are mapped to the features on respective dimensions in the user interest model, score values of respective users answering the question in the determined third party platform are calculated with the weight values of respective users, and a user whose score value satisfies a preset condition is selected therefrom as a user suitable for answering the question.

Manner 3: determining the third party platform designated by the questioning user as the third party platform suitable for answering the question, and then determining, with the user interest model, a user suitable for answering the question in the third party platform suitable for answering the question.

Manner 4: determining, with an expanded user interest model resulting from fusion of the platform model and the user interest model, a user suitable for answering the question.

In this manner, the features of the platform to which the user belongs are incorporated into the user interest model, thereby obtaining the expanded user interest model, and a question-to-user mapping is performed based on the expanded user interest model. Based on the features on respective dimensions in the expanded user interest model, features on respective dimensions are extracted from a to-be-distributed question; after the extracted features are mapped to features on respective dimensions in the expanded user interest model, score values of respective users answering the question are calculated with the weight values of respective features, and a user whose score value satisfies the preset condition is selected as the user suitable for answering the question.

The page generating unit 07 in the system is an existing unit in the platform system. The existing function is interfaced with the function provided by the present system, i.e., responsible for generating a questioning page for the question on the Q & A platform, and posting the obtained answer to the question on the questioning page.

After the question is distributed to the third party platform, the third party platform pushes the question with a messaging manner specific to the platform. With the Microblog platform as an example, the Microblog platform has its specific messaging manner, e.g., citing (@) a Microblog user, commenting on a Microblog user, and privately sending a message to a Microblog user, etc.; here, its specific messaging user may be utilized to push the question to the user suitable for answering the question.

There is a further manner of posting a question, i.e., the platform interfacing unit 01 provides, on the third party platform, a questioning page for the question on the Q & A platform through a Q & A platform application embedding within the third party platform; in this way, the user of the third party platform can perform answering the question on the questioning page. In this manner, a user of the third party platform actually performs data interaction with the Q & A platform application. For data update on the questioning page, e.g., t further question, modification and supplementation to the question, and subsequent answer will be updated on the questioning page on the third party platform.

When the answer pushing unit 04 in the system pushes the answer, if the question is generated by a user of the Q & A platform, then the answer to the question is pushed to the questioning user of the question through at least one of SMS, email, in-site message, etc. Or, if the question is originated from the third party platform interfaced with the Q & A platform, then the answer to the question is provided to the third party platform from which the question is originated, and the third party platform pushes the answer to the question to the questing user of the question with its specific manner.

Figure 5:
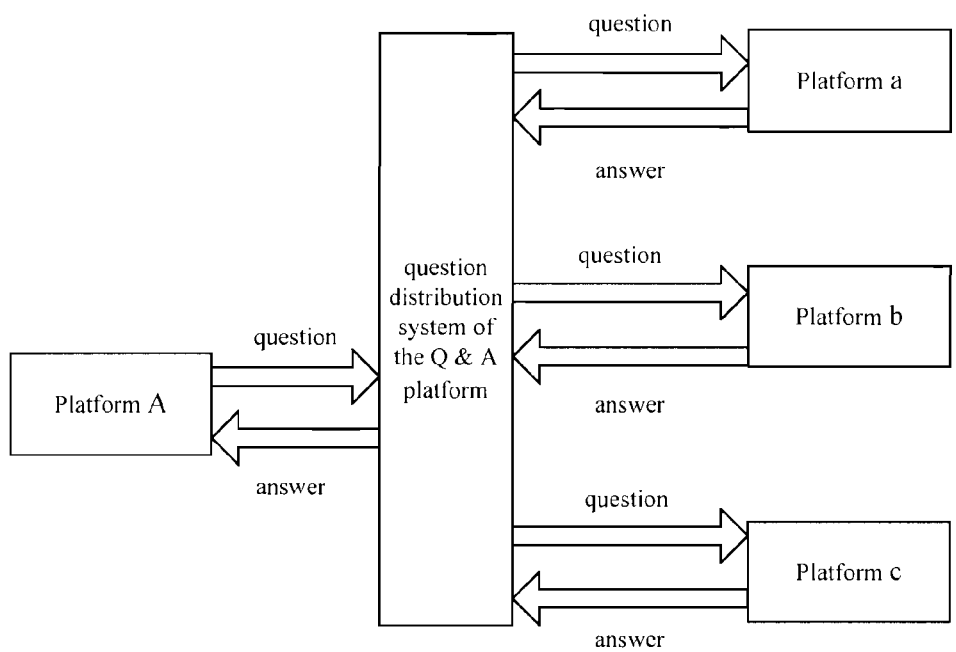
FIG. 5 shows a diagram of a question distribution system provided by the present invention being used as an entry of a third party platform function.

The system actually can integrate the entries via which the user uses the third party platform functions. As shown in FIG. 5, for the question provided by platform A, it is distributed to platform a, platform b, and platform c via the present system, and answers may be obtained from the platform a, platform b, and platform c, and replied to the platform A. Herein, the platform A may be a Q & A platform, or one of the platform a, platform b, and platform c, or other third party platform different from platform a, platform b, and platform c.

It may be seen from the above description that the method and system provided by the present invention may have the following advantages:

1) The present invention extends the source of answering a question to a third party platform interfaced with the Q & A platform, which breaks the limitation of the original Q & A platform, so that a user more suitable for answering the question in the third party platform can provide an answer, thereby enhancing the probability of the question being timely answered.

2) The third party platform interfaced with the Q & A platform may also obtain a broader answer resources with the manners of the present invention, thereby realizing mutual benefits, and the Q & A resources are gradually expanded to the network-wide scope.

3) Opening the Q & A platform API enables any modality of third party platform to conveniently access. The questioning user might not concern how to find a person that can answer his/her own question, but there would be a professional or a person suitable for answering his/her question to provide an answer.

4) The implementation manner of the third party platform in the present invention may have browser plugins, website pages or mobile phone APPs, etc. Such a wide compatibility form may facilitate the user to post questions and obtain questions in various manners, completely independent of the form of the Q & A platform.

In the several embodiments provided by the present invention, it should be understood that the disclosed system and method may be implemented through other manners. For example, the system embodiment as described above is only schematic, e.g., partitioning of the units is only a logical function partitioning; upon actual implementation, there may be other partitioning manners.

Units that are depicted as separate parts may be, or might not be, physically separated; the components displayed as units may be, or might not be, physical units, i.e., they may be located at one place, or distributed on a plurality of network units; a part or all of the units may be selected based on the actual needs to implement the objective of the solution of the present embodiment.

Further, various functional units in various embodiments of the present invention may be integrated into a processing unit; or various units may be physically present separately; or two or more units may be integrated into one unit. The above integrated units may be implemented in hardware, or in combination of hardware and software functional units.

The integrated unit implemented in the form of software function unit may be stored in a computer readable memory medium. The above software function unit is stored in a memory medium, including a plurality of instructions for enabling a set of computer device (which may be a personal computer, a server, or a network device, etc.) or a processor to perform a part of steps of the method according to various embodiments of the present invention. The abovementioned memory medium comprises, USB (Universal Serial Bus) flash driver, a mobile hard disk, a read only memory (ROM), a random access memory (RAM), a magnetic disk or an optical disk, and other mediums that may store program code.

What have been described above are only preferred embodiments of the present invention, not intended to limit the present invention. Any modification, equivalent substitution, improvement and the like made within the spirit and principle of the present invention should be comprised within the protection scope of the present invention.

The invention claimed is:

1. A question distribution method for a question and answer (Q & A) platform, the method comprising:
   obtaining a question entering into a Q & A platform through a first interface associated with the Q & A platform;
   displaying the question on the first interface;
   determining a user suitable for answering the question based on a question distribution model;
   distributing the question to a third party platform where the user suitable for answering the question is located, wherein the third party platform interfaces with the Q & A platform through an application programming interface (API) of the Q & A platform, and the question distributing model is established by using user data collected from the third party platform interfaced with the Q & A platform, wherein the third party platform is different from the Q & A platform, and the third party platform is modified according to API of the Q & A platform to interface with the Q & A platform;
   displaying the question on a second interface associated with the third party platform;
   obtaining an answer to the question from the third party platform through the second interface; and
   displaying the answer to the question on the first interface,
   wherein the question distribution model comprises a platform model, and the determining a user suitable for answering the question based on a question distribution model comprises:
   extracting features of respective types from the question based on features on respective types in the platform model, the platform model being built based on multi-type features;
   mapping the extracted features to the features on the respective types in the platform model;
   calculating, with weight values of respective features, score values of answers of respective platforms to the question; and
   selecting a platform having a score value satisfying a preset condition from the platforms.

2. The method according to claim 1, wherein the obtaining a question entering into a Q & A platform comprises:
   obtaining the question generated by a user of the Q & A platform; or,
   receiving the question pushed from the third party platform interfaced with the Q & A platform; or,
   actively pulling the question from the third party platform interfaced with the Q & A platform.

3. The method according to claim 1, wherein the method further comprises:
   collecting user data of the third party platform interfaced with the Q & A platform; and
   establishing the question distribution model by using the collected user data.

4. The method according to claim 3, wherein, before establishing the question distribution model with the collected user data, the method further comprises: performing code conversion to the collected user data, the code conversion specifically comprises:
   performing code conversion to the collected user data, thereby obtaining user data in a uniform code format;
   performing normalization processing to code-converted user data; and
   performing data structure standardization to the normalized user data.

5. The method according to claim 1, wherein the question distribution model comprises a user interest model, wherein;
   the user interest model is built based on at least one of following multi-type features and respective weight values thereof: a user's activity feature, a user's interest keyword feature, a user's interest tag feature, a user's interest classification feature, a user's geographical location feature, and a feature of platform originating the user; and
   the platform model is built based on at least one of following multi-type features and respective weight values thereof: a keyword feature at which the platform is good, a tag feature at which the platform is good, a classification feature at which the platform is good, a geographical location feature at which the platform is good, an authority feature of the platform, and a platform activity feature.

6. The method according to claim 5, wherein the determining a user suitable for answering the question based on a question distribution model comprises:
   determining, utilizing the platform model, the third party platform suitable for answering the question, and determining a user in the determined third party platform as a user suitable for answering the question; or,
   determining, utilizing the platform model, a third party platform suitable for answering the question, and then determining, utilizing the user interest model, the user suitable for answering the question in the third party platform suitable for answering the question; or determining a third party designated by the user as the third party platform suitable for answering the question, and then determining, utilizing the user interest model, the user suitable for answering the question in the third party platform suitable for answering the question; or determining, utilizing an extended user interest model derived from merging the platform model and the user interest model, the user suitable for answering the question.

7. The method according to claim 1, wherein, after distributing the question to a third party platform where the user suitable for answering the question is located, the method further comprises:

pushing, by the third party platform, the question to the user suitable for answering the question in a message sending manner specific to the third party platform; or, providing a questioning page for the question on the Q & A platform on the third party platform through a Q & A platform application embedded in the third party platform.

8. The method according to claim 2, wherein the providing the answer to the question to a user posing the question specifically comprises:

if the question is generated by the user of the Q & A platform, pushing the answer to the question to the user posing the question using at least one of an SMS, an email, and an internal site message; or, if the question is originated from the third party platform interfaced with the Q & A platform, providing the answer to the question to the third party platform originating the question, and pushing, by the third party platform, the answer to the question to the user posing the question in a manner specific to the third party platform.

9. A question distribution system for a question and answer (Q & A) platform, the system comprising:

at least one processor; and a memory storing instructions, wherein the instructions when executed by the at least one processor, cause the at least one processor to perform operations, the operations comprising:

providing an application programming interface (API) and perform an interaction between the Q & A platform and the third party platform;

obtaining a question entering into a Q & A platform through a first interface associated with the Q & A platform, the first interface displaying the entered question;

determining a user suitable for answering the question based on a question distribution model, and distributing the question to a third party platform where the user suitable for answering the question is located, wherein the question distributing model is established with user data collected from the third party platform interfaced with the Q & A platform; and obtaining an answer to the question from the third party platform through a second interface associated with the third party platform, the second interface displaying the question, and providing the answer to the question to first interface, wherein the question distribution model comprises a platform model, and the determining a user suitable for answering the question based on a question distribution model comprises:

extracting features of respective types from the question based on features on respective types in the platform model, the platform model being built based on multi-type features;

mapping the extracted features to the features on the respective types in the platform model;

calculating, with weight values of respective features, score values of answers of respective platforms to the question; and selecting a platform having a score value satisfying a preset condition from the platforms.

10. The system according to claim 1, wherein the obtaining a question entering into a Q & A platform comprises obtaining a question generated by the user of the Q & A platform; or, the question pushed from the third party platform interfaced with the Q & A platform; or, actively the question from the third party platform interfaced with the Q & A platform.

11. The system according to claim 9, wherein the operations further comprise:

collecting user data of the third party platform interfaced with the Q & A platform; and establishing the question distribution model with the collected user data.

12. The system according to claim 11, wherein the operations further comprise performing code conversion to the collected user data, the code conversion specifically comprises:

performing code conversion to the collected user data, thereby obtaining user data of a uniform code format;

performing normalization processing to code-converted user data; and performing data structure standardization to the normalized user data.

13. The system according to claim 9, wherein the question distribution model comprises a user interest model, wherein;

the user interest model is built based on at least one of following multi-type features and respective weight values thereof: a user's activity feature, a user's interest keyword feature, a user's interest tag feature, a user's interest classification feature, a user's geographical location feature, and a feature of a platform originating the user; and the platform model is built based on at least one of following multi-type features and respective weight values thereof: a keyword feature at which the platform is good, a tag feature at which the platform is good, a classification feature at which the platform is good, a geographical location feature at which the platform is good, an authority feature of the platform, and a platform activity feature.

14. The system according to claim 13, wherein the determining a user suitable for answering the question based on a question distribution model comprises:

determining, utilizing the platform model, the third party platform suitable for answering the question, and determine a user in the determined third party platform as a user suitable for answering the question; or, determining, utilizing the platform model, a third party platform suitable for answering the question, and then determining, utilizing the user interest model, the user suitable for answering the question in the third party platform suitable for answering the question; or determining a third party designated by the user as the third party platform suitable for answering the question, and then determining, utilizing the user interest model, the user suitable for answering the question in the third party platform suitable for answering the question; or determining, utilizing an extended user interest model derived from merging the platform model and the user interest model, the user suitable for answering the question.

15. The system according to claim 9, wherein after distributing the question to a third party platform where the user suitable for answering the question is located, the operations further comprise providing a questioning page for the question on the Q & A platform on the third party platform through a Q & A platform application embedded in the third party platform.

16. The system according to claim 10, wherein the providing the answer to the question to a user posing the question comprises: if the question is generated by the user of the Q & A platform, pushing the answer to the question to the user posing the question using at least one of an SMS, an email, an internal site message; or, if the question is originated from the third party platform interfaced with the Q & A platform, providing the answer to the question to the third party platform originating the question and pushing, by the third party platform, the answer to the question to the user posing the question in a manner specific to the third party platform.

17. A non-transitory computer readable memory medium, which comprises computer codes, when the computer codes are executed, the method of claim 1 is performed.

18. A computer software product, when the computer software product is executed by a computer device, the method of claim 1 is performed.

19. The method according to claim 1, wherein the third party platform interfaces with the Q & A platform by installing a component package released by the Q & A platform and performing a configuration.

* * * * *